Dec. 25, 1956          E. G. LOOS          2,775,140

INTERMITTENT DRIVE MECHANISM

Filed Jan. 11, 1954          4 Sheets-Sheet 1

INVENTOR.
EDWARD G. LOOS
BY
Mellin and Hanscom
ATTORNEYS

Dec. 25, 1956    E. G. LOOS    2,775,140
INTERMITTENT DRIVE MECHANISM
Filed Jan. 11, 1954    4 Sheets-Sheet 3

INVENTOR.
EDWARD G. LOOS
BY
Mellin and Hanscom
ATTORNEYS

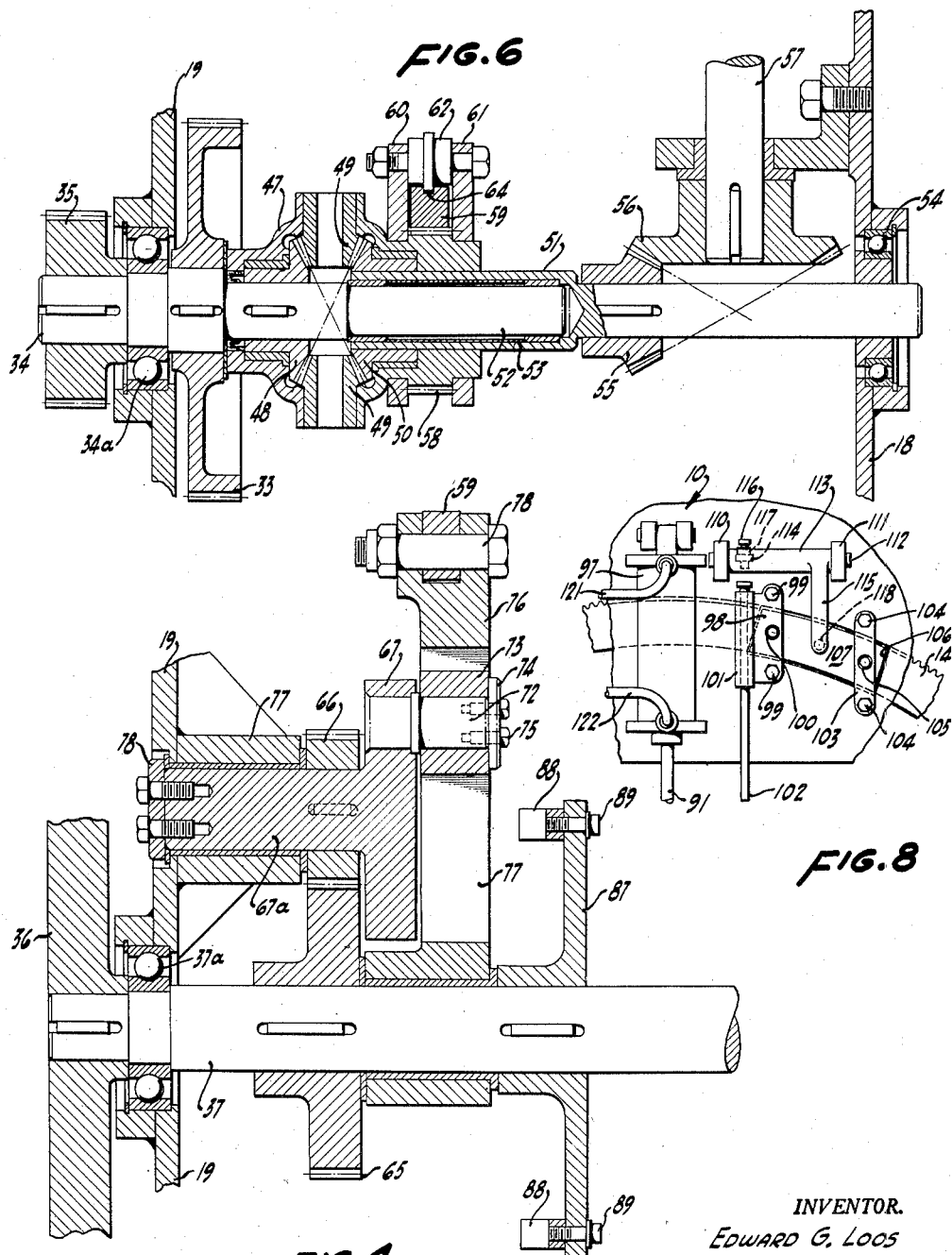

United States Patent Office 2,775,140
Patented Dec. 25, 1956

2,775,140

INTERMITTENT DRIVE MECHANISM

Edward G. Loos, Oakland, Calif., assignor, by mesne assignments, to John J. Knight, Piedmont, Calif.

Application January 11, 1954, Serial No. 403,193

5 Claims. (Cl. 74—665)

This invention relates to a novel form of drive mechanism to change constant speed rotary input to intermittent variable speed rotary output. The invention is more specifically directed to a mechanism of the type set forth for driving the cam shaft of a wire tying machine.

The principal object of the present invention is to provide a mechanism for changing constant speed rotary input power into intermittent variable speed rotary output power.

Another object of this invention is to provide a mechanism for changing the constant speed rotary input of the main power drive of a wire tying machine to intermittent variable speed drive for the knotting and cutting mechanisms of said machine.

One form which the invention may assume is exemplified in the following description and illustrated by way of example in the accompanying drawings, in which:

Fig. 4 is a sectional view take on line 4—4 of Fig. 3 showing further details of the rack drive and clutch release trip mechanism.

Fig. 5 is a sectional view taken on line 5—5 of Fig. 2 showing the details of the crank and sector drive for the main ring gear.

Fig. 6 is a sectional view of the differential drive shaft taken on line 6—6 of Fig. 2.

Fig. 8 is a fragmentary elevational view of the upper portion of the back of the machine showing the details of the power ram and brake assemblies.

Figure 1:
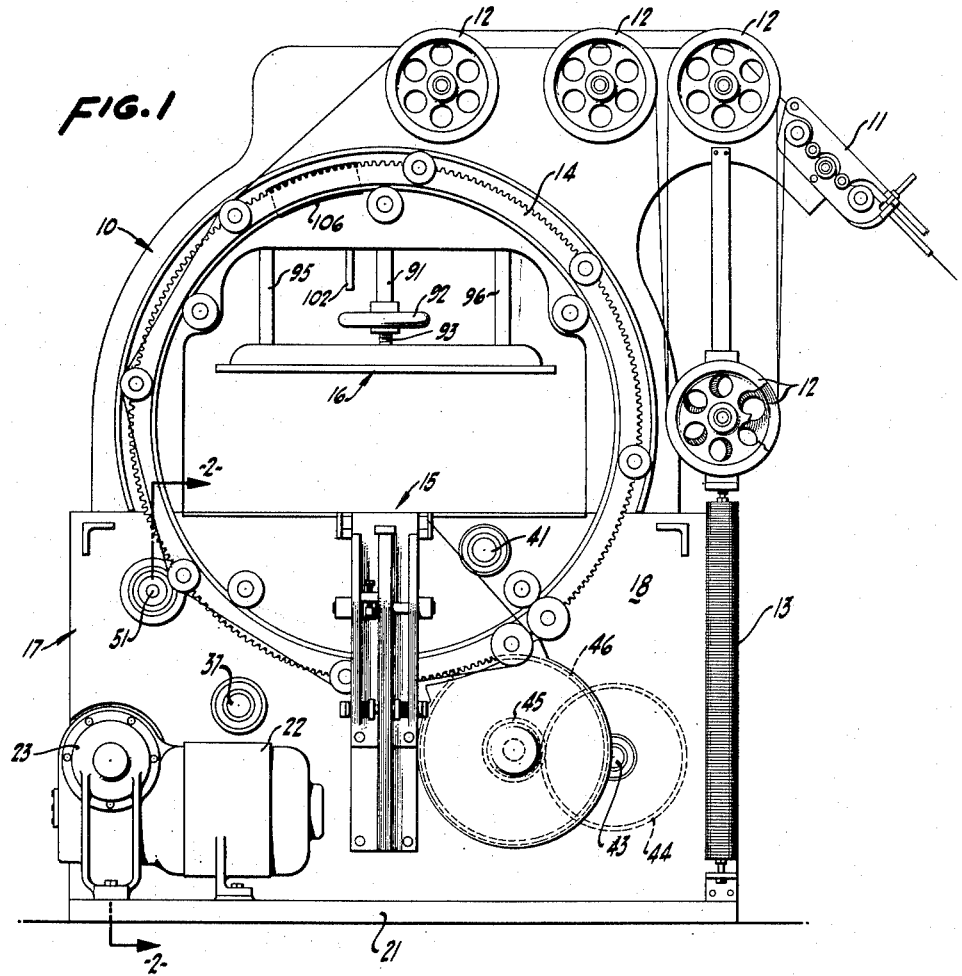
Fig. 1 is a front elevation of a wire tying machine embodying the principles of my invention.

Referring now to the drawings, wherein similar reference numerals are used to designate similar parts throughout the various views, and referring more specifically to Fig. 1, there is disclosed a wire tying machine having a frame generally indicated at 10 and means 11 for tensioning the incoming wire, the latter being trained over a series of pulleys 12 and a slack take-up device 13 to a ring gear 14 adapted to wrap the wire around a bundle to be tied. All of the structure thus far described is similar to the structure shown in the patent to C. E. Evans, No. 2,088,133, issued July 27, 1937.

In the area generally located by the reference numeral 15 there is located a knotting and cutting mechanism for twisting the ends of the wires together and cutting the free ends of the wire. A platen 16 adapted to be actuated by a mechanism to be described is provided to press down on the bundle and compress the material being wrapped.

Figure 2:
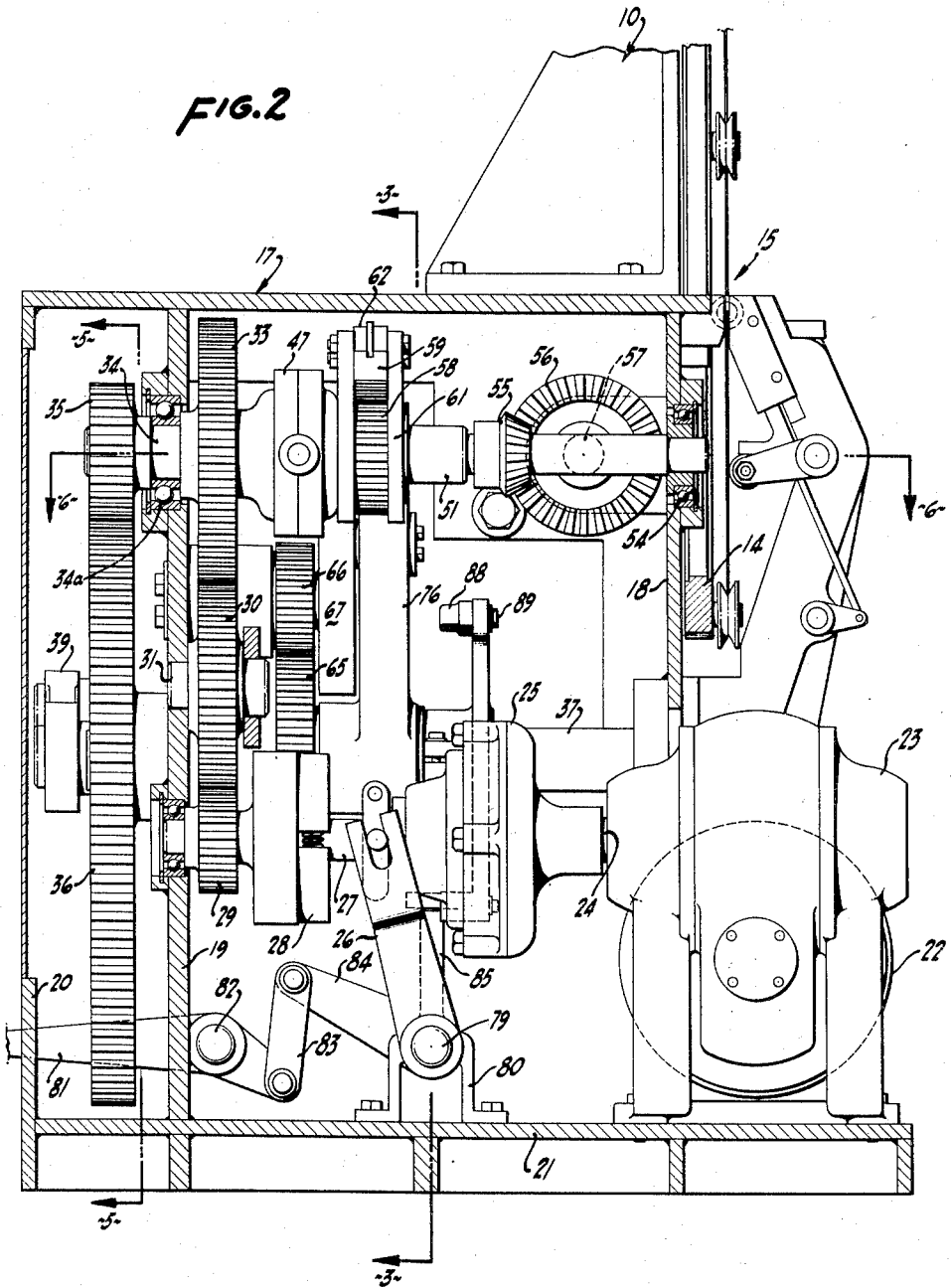
Fig. 2 is a sectional view taken on line 2—2 of Fig. 1 showing the principal gear train of the machine.

Referring now to Fig. 2, there is disclosed a lower housing section generally indicated at 17 comprising a front wall 18, an intermediate wall 19 and a rear wall 20 rising from a base 21, said housing containing the gear trains for actuating the various parts of the machine.

Main drive to the wrapping ring

An electric motor 22 is mounted on the base 21 adjacent the front of the machine and has incorporated therewith a gear reduction unit 23. As shown in Fig. 2 the output shaft 24 of the gear reduction unit 23 extends rearwardly of the machine and is connected to a clutch indicated at 25. Said clutch 25 has an operating yoke 26 adapted when oscillated to engage and disengage the clutch. The output shaft 27 of the clutch is connected through a torsion shock absorber unit 28 to a gear 29 which, through an idler gear 30 mounted on a stub shaft 31 attached to the wall 19 of the housing drives a gear 33 fixedly attached to a shaft 34 journaled in a bearing 34a mounted in the wall 19. Fixed to the end of the shaft 34, and located between the intermediate wall 19 and the outer wall 20, is a crank gear drive pinion 35 which meshes with a crank gear 36 fixedly mounted on a shaft 37 journalled for rotation in a bearing 37a mounted in the intermediate wall 19.

As best seen in Fig. 5 crank gear 36 has mounted adjacent its periphery a crank pin 38. A sector gear 40 is mounted for oscillatory movement about a pivot shaft 41 fastened to the intermediate wall 19 and is connected to the crank pin 38 by means of a connecting rod 39. The sector gear 40 meshes with a small pinion 42 attached to a shaft 43 journalled for rotation in the intermediate wall 19 and the front wall 18 of the housing. A large gear 44 is fixedly mounted to the end of the shaft 43 in front of the front housing wall 18 and meshes with a small gear 45 journalled for rotation on a stub shaft fixed to the front wall 18. Gear 45 is connected to a large gear 46 which meshes with and drives the ring gear 14.

From the structure so far described, it may be seen that when the clutch is engaged, the gear train rotates the crank gear 36, thus reciprocating the sector gear 40, and through the pinion 42 and the step-up gear train 43, 44, 45, rotates the gear ring 14. As the parts move from the full line position of Fig. 5 to the position shown in dotted lines, the crank gear 36 makes one-half of a revolution and the ring gear rotates approximately one and one-half revolutions in one direction, which action takes place during one cycle of the machine. During the next half revolution of the crank gear 36 the sector gear is oscillated in the opposite direction and hence the ring gear is given approximately one and one-half revolutions in the opposite direction, which action takes place during succeeding cycles of the machine.

Cam shaft drive

The knotting and cutting mechanism of the machine, located in the area generally indicated by the reference numeral 15 in Fig. 1 but not shown in detail herein, is driven by means of a cam shaft 57 having a bevel gear 56 fixed to the end thereof. Shaft 34, previously described as driven by gear 33, is the input shaft to a differential assembly contained in housing 47 and has fixedly mounted thereon an input gear 48 which meshes with a pair of spider gears 49 within the differential housing 47. Also meshing with said spider gears is an output gear 50 connected to an output shaft 51. As shown in Fig. 6, output shaft 51 has fixedly mounted thereon a cam shaft drive bevel gear 55 which meshes with the cam shaft gear 56. The inner end of the shaft 51 is counterbored as shown at 53 and receives therein the reduced diameter end portion 52 of the input shaft 34. The opposite end of the output end of the output shaft 51 is journalled in a bearing 54 mounted in the outer wall 18 of the housing.

The mechanism for securing a difference in rotation between the input shaft 34 and the output shaft 51 is as follows: A large gear 65 is mounted on shaft 37, which is driven by the crank gear 36, and meshes with a smaller gear 66 fixedly mounted to a stub shaft 67a formed integral with a disc 67. The stub shaft 67a is mounted for rotation within a hub 77 fastened to the inner surface of the intermediate wall of the housing retained therein by means of a flange 78 secured to the end of the shaft by means of suitable fastening members. The disc 67 carries adjacent its periphery a crank pin 72 having rotatably mounted thereon a square sliding block 73. Journalled for rotation on the shaft 37 is an arm 76 having a slot 77 formed longitudinal thereof. Slot 77 embraces the sliding block 73 mounted on the crank pin 72. The sliding block is retained within said groove by means of a cap member 74 held to the pin 72 by means of suitable fastening members 75. The outer end of arm 76 is pivotally attached to one end of a rack 59 with a pivot pin 78. The rack member 69 engages and meshes with a gear 58 attached to the housing 47 of the differential assembly. The rack is held in engagement with gear 58 by means of a yoke assembly comprising two sides 60 and 61, each embracing a hub on either side of the gear 58 and extending upward beyond the rack member 59. Two roller members 62 and 63 are fastened between said side members adjacent their upper edge. Said roller members 62 and 63 are adapted to roll in a groove 64 formed in the upper surface of said rack member.

Figure 3:
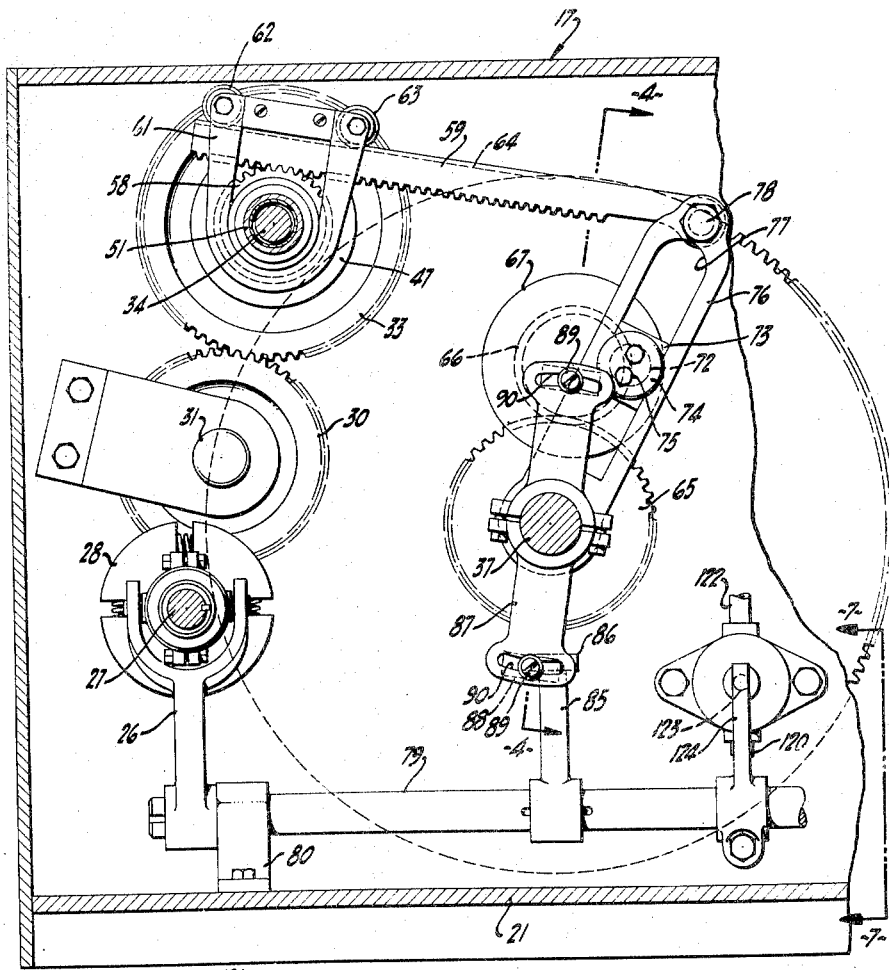
Fig. 3 is a sectional view taken on line 3—3 of Fig. 2 showing the details of the rack drive and the clutch release trip mechanism.

From the structure described immediately above, it may be seen that as the crankshaft 37 makes one-half revolution, the disc 67 makes one complete revolution due to the two-to-one gear ratio between the gears 65 and 66. Hence, the arm 76 and the rack 59 attached to the end thereof complete one cycle per one-half revolution of crank gear 36. As the parts are depicted in Fig. 3, counterclockwise rotation of the shaft 34 will cause clockwise rotation of the crank gear 36 and the shaft 37 upon which it is mounted, thus causing clockwise rotation of the gear 65 and counterclockwise rotation of the disc 67. Thus it can be seen that the rack 59 will move in a direction to turn the differential housing 47 in the same direction as the input shaft 34 during the first half cycle of operation and tend to cancel out any rotation of the output shaft 51. During the second half cycle of operation, the rack 59 will move in a direction to rotate the differential housing 47 in a direction opposite to the direction of rotation of the input shaft 34 and tend to double the rotation of the output shaft 51 with respect to the rotation of the input shaft 34. At the completion of the cycle, the input shaft 34 and the output shaft 51 will have made the same number of revolutions.

The gear ratio between gear 35 and crank gear 36 and the gear ratio between the cam shaft drive pinion 55 and the cam shaft gear 56 is so arranged that the cam shaft gear 56 will make one complete revolution per cycle of the machine, while the crank gear 36 will make one-half revolution per cycle of the machine.

Clutch operating mechanism and trip assembly

Mounted in the housing 17 transversely of the machine adjacent the base 21 is a clutch operating shaft 79 supported by suitable brackets 30 (only one of which is shown) fastened to the base 21. A pedal arm 81 extends through the intermediate and rear walls of the machine and is journalled for rotation on a pivot 82 supported by the intermediate wall 19. The inner end of the arm 81 is attached by means of a link 83 to an arm 84 fixedly fastened to the clutch operating shaft 79. The clutch yoke 26 previously mentioned is fixedly attached to the shaft 79 so that when the pedal attached to the arm 81 is depressed, the clutch shaft 79 will be rotated in a clockwise direction, as viewed in Fig. 2, and the clutch yoke 26 will be moved inwardly to engage the clutch 25.

As best shown in Fig. 3, a trip arm 85 is fixedly attached to the clutch operating shaft 79 and carries adjacent its upper end a roller 86. An arm 87 is fixedly attached at its midpoint to the shaft 37 and is provided adjacent each end with an arcuate slot 90. Two trip cams 88 are mounted, as shown in Fig. 4, one adjacent to either end of the arm 87 and held thereto by means of studs 89 passing through the arcuate slots 90, whereby the cams 88 may be arcuately adjusted with respect to said arm 87. As previously described, the shaft 37 attached to the crank pin 72 makes one-half revolution per cycle of the machine, and after one-half revolution, one or the other of the cams 88 will contact the roller 86, forcing the clutch operating shaft to rotate in a counterclockwise direction to release the clutch.

Power cylinder assembly

Figure 7:
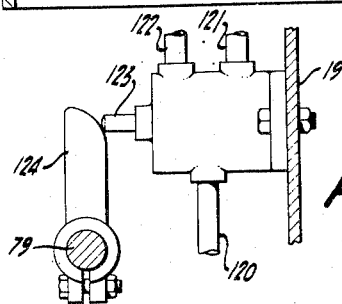
Fig. 7 is an end view of the power ram control valve taken on line 7—7 of Fig. 3.

As shown in Fig. 8, a power cylinder 97 is attached at its upper end to the frame 10 of the machine and has a reciprocating plunger 91 extending from the lower end thereof. As best seen in Fig. 1 the lower end of the reciprocating plunger 91 has rotatably mounted thereto a hand wheel 92 which is adapted to threadedly engage a threaded stud 93 attached to the upper surface of the platen 16, whereby initial adjustment of the platen 16 may be made by spinning the hand wheel. The platen 16 is guided for rectilinear vertical movement by means of two guide rods 95 and 96 attached to the upper surface thereof, slidably received in suitable guides provided on the rear surface of the frame. The power cylinder 97 is a double-acting cylinder adapted to be forced either upwardly or downwardly by means of air pressure being applied through one or the other of air lines 121 and 122 attached to the upper and lower ends thereof. A suitable control valve for applying air pressure to either of the air lines 121 or 122 is fixedly mounted to the inner surface of the intermediate wall 19 of the housing in the manner shown in Fig. 7. Compressed air (from a suitable source of supply not shown) is supplied thereto by means of air inlet line 120. An operating plunger 123 extends from the end of the valve housing toward a valve operating arm 124 attached to the clutch shaft 79, whereby when the clutch shaft 79 is actuated to start the machine cycle, the arm 124 contacts the end of the plunger 123, communicating air line 121 with the inlet air line 120, permitting air pressure to enter the upper end of the power cylinder, and forcing the plunger 91 and the platen 16 downward into contact with the material to be wrapped. At the completion of the cycle, when the clutch shaft 79 is rotated in a counterclockwise direction, as viewed in Fig. 7, the plunger 123 is released and communication is established between the inlet air line 120 and the fluid conduit 122, permitting air pressure to enter the lower end of the cylinder 97, forcing the plunger 91 to return to its uppermost position.

Brake assembly

A suitable brake for stopping the machine at the end of a cycle is provided adjacent the ring gear and attached to the frame member 10 to one side of the power cylinder 97 in the manner shown in Fig. 8. An arcuate cutout portion 106 is provided in the frame adjacent the rear surface of the ring gear 14. A bracket 98 spans the cutout portion 106 and is fastened to the rear of the frame by means of cap screws 99. Bracket 98 has a hole 100 provided in the area of the bracket adjacent the center of the cutout portion 106. A tubular brake operating rod guide 101 is welded to the side of the bracket 98 and supports for vertical reciprocation therein an operating rod 102. The operating rod 102 is in line with and adapted to be contacted by the hand wheel 92 in a manner clearly shown in Fig. 1 on the return or upward stroke of the power piston 91. A second bracket 103 spans the cutout portion 106 and is formed with a central hole 105 adjacent the mid-section of the cutout portion 106, and is fixed to the rear of the frame by means of cap screws 104.

An arcuate brake shoe 107 is fitted into the cutout section 106 and has two studs protruding from the rear end thereof, one each received in the openings 100 and 105 provided in the two brackets 98 and 103. The forward face of the brake shoe bears against the rear surface of ring gear 14. Above the cutout section 106 are two brackets 110 and 111 fixed to and extending rearwardly from the rear surface of the frame 10. A bolt 112 extends through said brackets and rotatably supports a tubular sleeve 113. Said sleeve has two lugs 114 and 115 which extend at right angles to each other from the surface of said sleeve. The lug 114 extends toward the frame of the machine above and in line with the end of operating rod 102. Threadedly received in the end of the lug 114 is an adjustable set screw 116, which contacts the upper surface of the operating rod 102, and is adapted to be locked in position by means of a lock nut 117. The lug 115 extends downwardly from the sleeve 113 and is in line with a pin 118 attached to and extending at right angles to the rear surface of the brake shoe 107. When the operating rod 102 is raised by the hand wheel 92, the sleeve 113 is rotated and the lug 115 forces the brake shoe 107 against the inner surface of the ring gear 14, stopping the motion of the machine after the cycle has been completed.

*Operation*

The operator places the material to be tied on the table provided by the upper surface of the housing 17, generally in the area indicated by the arrow 15 in Fig. 1. He then depresses the clutch pedal attached to the arm 81 thus rotating the clutch shaft 79 in a clockwise direction, as shown in Fig. 2 to actuate the power cylinder to release the brake 107 and force the platen 16 down to compress the material to be tied. Rotation of clutch shaft 79 at the same time engages clutch 25 which connects the drive motor to the crank gear 36 to rotate the same, thus actuating the sector gear 40 to rotate the ring gear 14. During the first half cycle, the disc 67 and arm 76 with the rack 59 and differential 47 keep the cam shaft 57 stationary or relatively so. During the later half cycle the above parts rotate the cam shaft 57 to actuate the knotting and cutting off mechanisms. At the completion of the cycle, one of the cams 88 attached to shaft 37 will contact the roller 86 attached to the clutch operating shaft 79 and rotate the shaft counterclockwise, as viewed in Fig. 2, thus releasing clutch 25 and actuating the power cylinder control valve to raise the platen 16 and to apply the brake 107 against the rear surface of the ring gear 14.

From the description disclosed herein, it may be seen that I have provided a novel form of drive for the cam shaft of a wire tying machine, which will impart rotation to the cam shaft only during the latter part of the cycle of the machine while the machine is driven from a single source of power rotating at a constant speed.

Having thus described my invention, what I claim and desire to secure by Letters Patent is:

1. A drive mechanism for a bundle tying machine comprising a drive motor, a first driving means transmitting alternate opposite rotary motion to a first mechanism, clutch means intermittently connecting said first driving means to said motor, a cam shaft for actuating a second mechanism, a second driving means for rotating said cam shaft, said second driving means comprising an input shaft driven at a constant speed by said first driving means, an output shaft, a differential assembly connected between said shafts, a housing for said differential assembly, said housing being free to rotate relative to both said input and output shafts, means connecting said output shaft to said cam shaft, and means to rotate said differential housing in the same direction as the rotation of said input shaft during the first half cycle of said machine and in the opposite direction during the last half cycle of said machine, whereby the output shaft is approximately stationary during the first half cycle and rotates at approximately twice the input shaft speed during the second half cycle causing said second mechanism to be actuated only during the latter part of the cycle.

2. A drive mechanism for a bundle tying machine comprising a drive motor, a first driving means transmitting alternate opposite rotary motion to a first mechanism, clutch means intermittently connecting said first driving means to said motor, a cam shaft for actuating a second mechanism, a second driving means for rotating said cam shaft, said second driving means comprising an input shaft driven at a constant speed by said first driving means, an output shaft, a differential assembly connected between said shafts, a housing for said differential assembly, said housing being free to rotate relative to both said input and output shafts, means connecting said output shaft to said cam shaft, and means to rotate said differential housing with simple harmonic motion in the same direction as the rotation of said input shaft during the first half cycle of said machine and in the opposite direction during the last half cycle of said machine, whereby the output shaft is approximately stationary during the first half cycle and rotates at approximately twice the input shaft speed during the second half cycle causing said second mechanism to be actuated only during the latter part of the cycle.

3. A drive mechanism for a bundle tying machine comprising a drive motor, a first driving means transmitting alternate opposite rotary motion to a first mechanism, clutch means intermittently connecting said first driving means to said motor, a cam shaft for actuating a second mechanism, a second driving means for rotating said cam shaft, said second driving means comprising an input shaft driven at a constant speed by said first driving means, an output shaft, a differential assembly connected between said shafts, a housing for said differential assembly, said housing being free to rotate relative to both said input and output shafts, means connecting said output shaft to said cam shaft, means comprising a gear on said differential housing and a reciprocating rack in engagement with said gear to rotate said differential housing in the same direction as the rotation of said input shaft during the first half cycle of said machine and in the opposite direction during the last half cycle of said machine, whereby the output shaft is approximately stationary during the first half cycle and rotates at approximately twice the input shaft speed during the second half cycle, and means driven by said input shaft to reciprocate said rack causing said second mechanism to be actuated only during the latter part of the cycle.

4. A drive mechanism for a bundle tying machine comprising a drive motor, a first driving means transmitting alternate opposite rotary motion to a first mechanism, clutch means intermittently connecting said first driving means to said motor, a cam shaft for actuating a second mechanism, a second driving means for rotating said cam shaft, said second driving means comprising an input shaft driven at a constant speed by said first driving means, an output shaft, a differential assembly connected between said shafts, a housing for said differential assembly, said housing being free to rotate relative to both said input and output shafts, means connecting said output shaft to said cam shaft, means comprising a gear on said differential housing and a reciprocating rack in engagement with said gear to rotate said differential housing in the same direction as the rotation of said input shaft during the first half cycle of said machine and in the opposite direction during the last half cycle of said machine, whereby the output shaft is approximately stationary during the first half cycle and rotates at approximately twice the input shaft speed during the second half cycle, and means driven by said input shaft to reciprocate said rack with simple harmonic motion causing said second mechanism to be actuated only during the latter part of the cycle.

5. A drive mechanism for a bundle tying machine comprising a drive motor, a first driving means transmitting alternate opposite rotary motion to a first mechanism, clutch means intermittently connecting said first driving means to said motor, a cam shaft for actuating a second mechanism, a second driving means for rotating said cam shaft, said second driving means comprising an input shaft driven at a constant speed by said first driving means, an output shaft, a differential assembly connected between said shafts, a housing for said differential assembly, said housing being free to rotate relative to both said input and output shafts, means connecting said output shaft to said cam shaft, means comprising a gear on said differential housing and a reciprocating rack in engagement with said gear to rotate said differential housing in the same direction as the rotation of said input shaft during the first half cycle of said machine and in the opposite direction during the last half cycle of said machine, whereby the output shaft is approximately stationary during the first half cycle and rotates at approximately twice the input shaft speed during the second half cycle, a secondary input shaft driven by said input shaft at one revolution per cycle of said machine, a disc mounted on said secondary input shaft for rotation therewith, a pin on said disc, an arm, one end of said arm being mounted on a fixed stub shaft parallel to said secondary input shaft for rotation relative thereto, the other end of said arm being pivotally connected to one end of said rack, a slot in said arm embracing said pin, whereby rotation of said disc causes said arm to oscillate and hence said rack to reciprocate with simple harmonic motion causing said second mechanism to be actuated only during the latter part of the cycle.

References Cited in the file of this patent

UNITED STATES PATENTS

| | | |
|---|---|---|
| 497,297 | Beard | May 16, 1893 |
| 1,190,407 | Helmbold | July 11, 1916 |
| 1,875,260 | Parker | Aug. 30, 1932 |
| 1,983,473 | Leaver | Dec. 4, 1934 |

FOREIGN PATENTS

| | | |
|---|---|---|
| 742,076 | Germany | Nov. 22, 1943 |